United States Patent
Zhang et al.

(10) Patent No.: US 12,126,175 B2
(45) Date of Patent: Oct. 22, 2024

(54) POWER SUPPLY CONTROL SYSTEM AND CONTROL METHOD THEREOF

(71) Applicants: Zhejiang Geely Holding Group Co., Ltd, Zhejiang (CN); GEELY AUTOMOBILE RESEARCH INSTITUTE (NINGBO) CO., LTD, Zhejiang (CN)

(72) Inventors: Ruifeng Zhang, Zhejiang (CN); Guangmu Yu, Zhejiang (CN); Daiping Jiang, Zhejiang (CN); Yue Zhao, Zhejiang (CN); Shuibao Guo, Zhejiang (CN); Xianming Yang, Zhejiang (CN); Yan Yan, Zhejiang (CN); Guoyi Yang, Zhejiang (CN)

(73) Assignees: ZHEJIANG GEELY HOLDING GROUP CO., LTD, Zhejiang (CN); GEELY AUTOMOBILE RESEARCH INSTITUTE (NINGBO) CO., LTD, Zhejiang (CN)

( * ) Notice: Subject to any disclaimer, the term of this patent is extended or adjusted under 35 U.S.C. 154(b) by 6 days.

(21) Appl. No.: 18/340,857

(22) Filed: Jun. 24, 2023

(65) Prior Publication Data
US 2023/0335996 A1    Oct. 19, 2023

Related U.S. Application Data

(63) Continuation of application No. PCT/CN2021/079548, filed on Mar. 8, 2021.

(51) Int. Cl.
*H02J 3/32* (2006.01)
*H02M 3/335* (2006.01)

(52) U.S. Cl.
CPC ........... *H02J 3/32* (2013.01); *H02M 3/33584* (2013.01); *H02J 2207/20* (2020.01)

(58) Field of Classification Search
CPC .... H02J 3/32; H02J 2207/20; H02M 3/33584; H02M 3/335
See application file for complete search history.

(56) References Cited

U.S. PATENT DOCUMENTS

| | | | |
|---|---|---|---|
| 2017/0106764 A1 | 4/2017 | Beaston et al. | |
| 2017/0229866 A1 | 8/2017 | Ghotra et al. | |
| (Continued) | | | |

FOREIGN PATENT DOCUMENTS

| | | | |
|---|---|---|---|
| CN | 205811630 U | 12/2016 | |
| CN | 106532850 A * | 3/2017 | ............... H02J 3/32 |
| (Continued) | | | |

OTHER PUBLICATIONS

International Search Report dated Jul. 9, 2021 in International Application No. PCT/CN2021/079548. English translation attached.
(Continued)

*Primary Examiner* — Robert L Deberadinis (57) ABSTRACT

Provided are a power supply control system and a control method thereof. The power supply control system includes: a transformer connected to a power grid; an output socket connected to the transformer via an alternating current bus and configured to be connected to an electric device in the electric vehicle charging station; and an energy storage system including an AC/DC bidirectional converter and an energy storage battery connected to the alternating current bus via the AC/DC bidirectional converter. The energy storage system is configured to be controlled to, in response to the power supply control system being in an uninterruptible power supply mode: switch the AC/DC bidirectional converter into an inversion state; and output no electric energy when the power grid has a normal voltage and supply electric energy only by the energy storage system when the power grid has an abnormal voltage.

20 Claims, 2 Drawing Sheets

(56) References Cited

U.S. PATENT DOCUMENTS

2017/0229905 A1  8/2017  Ghotra et al.
2018/0339595 A1  11/2018  Chang

FOREIGN PATENT DOCUMENTS

| CN | 206135505 U | 4/2017 |
| CN | 111404248 A | 7/2020 |
| CN | 212422878 U | 1/2021 |

OTHER PUBLICATIONS

Extended European Search Report from corresponding European Application No. EP21929481.6, dated Mar. 12, 2024.

* cited by examiner

POWER SUPPLY CONTROL SYSTEM AND CONTROL METHOD THEREOF

CROSS-REFERENCE TO RELATED APPLICATION

This application is a continuation of International Application No. PCT/CN2021/079548 filed on Mar. 8, 2021, the entire content of which is incorporated herein by reference.

FIELD

The present disclosure relates to the field of charging station control, and more particularly, to a power supply control system and a control method thereof.

BACKGROUND

Currently, with the popularity of electric vehicles, there are a growing number of charging stations. A charging station having an energy storage system is gradually developed during its construction for the purposes of avoiding excessive shock on a power grid and cooperation use of various types of electric energy sources.

During charging of the charging station, when a sudden power failure occurs, it would cause problems affecting user experience such as difficulty in unlocking of an electronic lock of a charging gun and loss of charging user settlement data. As a result, some of the charging stations are equipped with an uninterruptible power supply (UPS) for performing operation processing related to the power failure when the charging station is suddenly powered off.

Figure 1:
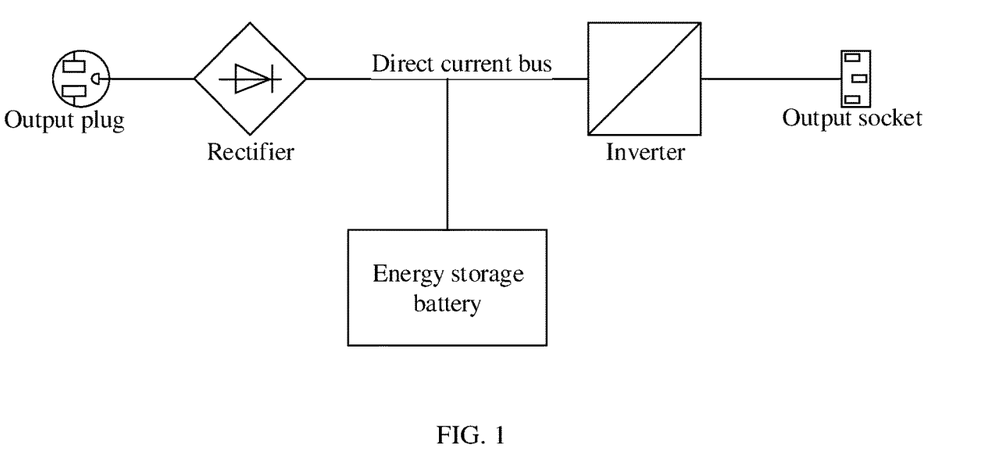
FIG. 1 is a schematic diagram of a connection of an uninterruptible power supply in the related art.

FIG. 1 shows an existing UPS topology relationship including a rectifier, an inverter, and an energy storage battery. The inverter is supplied with power via a direct current bus and inverts the power into an alternating current (generally 220 V) required for a load. When an input power supply is normal, the rectifier generates a direct current and outputs the direct current to the energy storage battery and the inverter. When the input power supply is abnormally interrupted, the power is supplied to the inverter through the energy storage battery to ensure that an output socket has a normal power supply. However, when the charging station is separately equipped with the above UPS, cost of some of the charging stations would be increased.

SUMMARY

In view of the above problems, the present disclosure is proposed to provide a power supply control system and a control method thereof, which can overcome the above problems or at least partially solve the above problems.

One object of a first aspect of the present disclosure is to provide a power supply control system, which can reduce cost of an uninterruptible power supply.

Another object of the present disclosure is to avoid an abnormal operation problem of a charging station due to a power outage in a power grid.

One object of a second aspect of the present disclosure is to provide a power supply control method applied in the above power supply control system, which can achieve the uninterrupted power supply function while reducing the cost.

According to one aspect of embodiments of the present disclosure, a power supply control system is provided. The power supply control system is applied in an electric vehicle charging station having an energy storage system. The power supply control system includes: a transformer, an output socket, and an energy storage system. The transformer is connected to a power grid. The output socket is connected to the transformer via an alternating current bus and is configured to be connected to an electric device in the electric vehicle charging station. The energy storage system includes an alternating-current/direct-current (AC/DC) bidirectional converter and an energy storage battery connected to the alternating current bus via the AC/DC bidirectional converter. The energy storage system is configured to be controlled to, in response to the power supply control system being in an uninterruptible power supply mode: switch the AC/DC bidirectional converter into an inversion state; and output no electric energy when the power grid has a normal voltage and supply electric energy only by the energy storage system when the power grid has an abnormal voltage.

In some embodiments of the present disclosure, the energy storage system is further configured to, in response to the power supply control system being in the uninterruptible power supply mode, in addition to switching the AC/DC bidirectional converter into the inversion state: set an output voltage Vb of the AC/DC bidirectional converter as a greater one of Ugrid-Gap and Umin; and set an output current of the AC/DC bidirectional converter based on an output capability of the AC/DC bidirectional converter and a current output capability of the energy storage battery, where Ugrid represents a real-time voltage of the power grid, Gap represents a fixed value greater than 0, and Umin represents a voltage greater than or equal to a minimum operating voltage of the electric vehicle charging station and smaller than the normal voltage of the power grid.

In some embodiments of the present disclosure, a smaller one of a first current-limiting value and a second current-limiting value is determined as the output current of the AC/DC bidirectional converter. The first current-limiting value is calculated based on the output capability of the AC/DC bidirectional converter, and the second current-limiting value is calculated based on the current output capability of the energy storage battery.

In some embodiments of the present disclosure, the energy storage system is further configured to, in response to the power supply control system being in the uninterruptible power supply mode, in addition to switching the AC/DC bidirectional converter into the inversion state: set an output current of the AC/DC bidirectional converter as 0 and an output voltage Vb as a rated voltage, when the power grid has the normal voltage; and set the output current of the AC/DC bidirectional converter as a required current of the electric device in the electric vehicle charging station and the output voltage Vb as the rated voltage, when the power grid has the abnormal voltage.

In some embodiments of the present disclosure, the energy storage system is further configured to switch the AC/DC bidirectional converter into a rectification state in response to the power supply control system being in a power grid power supply mode.

In some embodiments of the present disclosure, the energy storage system is further configured to switch the AC/DC bidirectional converter into a non-operating state in response to the power supply control system being in a standby mode.

According to one aspect of embodiments of the present disclosure, a power supply control method is provided. The power supply control method is applied in the power supply control system as described above. The power supply control method includes a control step in the uninterruptible power supply mode of, in response to the power supply control system being in the uninterruptible power supply mode: switching the AC/DC bidirectional converter into the inversion state; and controlling the energy storage system to output no electric energy when the power grid has the normal voltage and to supply the electric energy only by the energy storage system when the power grid has the abnormal voltage.

In some embodiments of the present disclosure, the controlling the energy storage system to output no electric energy when the power grid has the normal voltage and to supply the electric energy only by the energy storage system when the power grid has the abnormal voltage includes: setting, in response to the power supply control system being in the uninterruptible power supply mode, an output voltage Vb of the AC/DC bidirectional converter as a greater one of Ugrid-Gap and Umin; and setting an output current of the AC/DC bidirectional converter based on an output capability of the AC/DC bidirectional converter and a current output capability of the energy storage battery, where Ugrid represents a real-time voltage of the power grid, Gap represents a fixed value greater than 0, and Umin represents a voltage greater than or equal to a minimum current operating voltage of the electric vehicle charging station and smaller than a normal voltage of the power grid.

In some embodiments of the present disclosure, the setting the output current of the AC/DC bidirectional converter based on the output capability of the AC/DC bidirectional converter and the current output capability of the energy storage battery includes: calculating a first current-limiting value based on the output capability of the AC/DC bidirectional converter; calculating a second current-limiting value based on the current output capability of the energy storage battery; and determining a smaller one of the first current-limiting value and the second current-limiting value as the output current of the AC/DC bidirectional converter.

In some embodiments of the present disclosure, the controlling the energy storage system to output no electric energy when the power grid has the normal voltage and to supply the electric energy only by the energy storage system when the power grid has the abnormal voltage includes: setting an output current of the AC/DC bidirectional converter as 0 and an output voltage Vb as a rated voltage value, when the power grid has the normal voltage; and setting the output current of the AC/DC bidirectional converter as a required current of the electric device in the electric vehicle charging station and the output voltage Vb as the rated voltage, when the power grid has the abnormal voltage.

In some embodiments of the present disclosure, the power supply control method further includes, prior to the control step in the uninterruptible power supply mode: an identification step of identifying a current operating mode of the power supply control system; and performing the control step in the uninterruptible power supply mode in response to identifying that the current operating mode of the power supply control system is the uninterruptible power supply mode.

In some embodiments of the present disclosure, the power supply control method further includes, subsequent to the identification step: controlling, in response to identifying that the current operating mode of the power supply control system is a power grid power supply mode, the AC/DC bidirectional converter to be switched into a rectification state to supply power through the power grid.

In some embodiments of the present disclosure, the power supply control method further includes, subsequent to the identification step: controlling, in response to identifying that the current operating mode of the power supply control system is a standby mode, the AC/DC bidirectional converter to be switched into a non-operating state.

In the present disclosure, by controlling the existing energy storage system, without changing the system layout, the uninterruptible power supply function can be achieved through controlling the output of the energy storage system. That is, in response to the power supply control system being in the uninterruptible power supply mode, the AC/DC bidirectional converter 31 is switched into the inversion state, and no electric energy is outputted when the power grid has the normal voltage and the electric energy is supplied only by the energy storage system when the power grid has the abnormal voltage. That is, this present disclosure provides a solution in which no additional uninterruptible power supply is required for the charging station having the energy storage system. In such a solution, separate rectifier and inverter that are independent of each other and can maintain the operating state simultaneously are not required. As a result, it is possible to reduce the cost of achieving the uninterruptible power supply function.

Further, the output voltage of the AC/DC bidirectional converter is set as the greater one of the Ugrid-Gap and the Umin. As a result, the output voltage of the energy storage system is always lower than the voltage of the alternating current bus when the power grid has the normal voltage. In this case, the energy storage system outputs no energy. When the voltage of the power grid fluctuates suddenly or even is interrupted, or is lower than a lowest voltage required for operation of other device in the charging station, the energy storage system can maintain the voltage of the alternating current bus of a whole field station at a lowest operating voltage, which can ensure normal operations of all devices.

Further, setting manners of the above voltage and current enable the energy storage system to be in a ready state when the power grid is normal, and to be directly switched into an output mode and supply power to the devices in the charging station when the power grid is powered off.

The above description is merely an overview of the technical solutions of the present disclosure. To facilitate a clear understanding of technical approaches of the present disclosure, the technical solutions can be performed in accordance with the contents of the specification. Meanwhile, to clarify and explain the above and other objects, features, and advantages of the present disclosure, specific implementations of the present disclosure will be described below.

The above and other objects, advantages, and features of the present disclosure will become more apparent to those skilled in the art from the following detailed description of specific embodiments of the present disclosure made with reference to the accompanying drawings.

BRIEF DESCRIPTION OF THE DRAWINGS

Some specific embodiments of the present disclosure will be described below in detail with reference to the accompanying drawings in an exemplary rather than restrictive manner. In the accompanying drawings, same or similar elements or parts are denoted by same reference numerals. It should be understood by those skilled in the art that these accompanying drawings are not necessarily drawn to scale. In the accompanying drawings.

DETAILED DESCRIPTION

Exemplary embodiments of the present disclosure will be described in detail below with reference to the accompanying drawings. Although the exemplary embodiments of the present disclosure are illustrated in the accompanying drawings, it should be understood that the present disclosure may be embodied in various forms and should not be construed as being limited to the embodiments set forth herein. Instead, these embodiments are provided for a thorough understanding of the present disclosure and can fully convey the scope of the disclosure to those skilled in the art.

Figure 2:
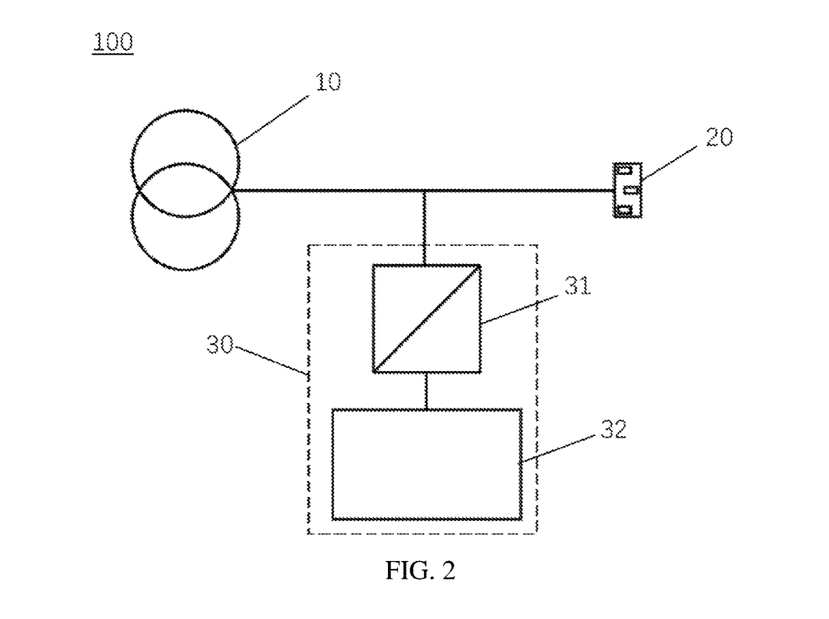
FIG. 2 is a schematic diagram of a connection of an energy storage system applied in a charging station in the related art.

As described in the BACKGROUND, when a charging station is separately equipped with an uninterruptible power supply, cost would be increased. The inventor has researched the related art to avoid problems such as a data loss and difficulty in unlocking a device in a charging station due to a power failure of a power grid or a voltage fluctuation of the power grid with lower cost. Based on a structure of an energy storage system used in an existing charging station, as illustrated in FIG. 2, unlike an UPS shown in FIG. 1, the energy storage system used in the charging station is equipped with only one AC/DC bidirectional converter, rather than being equipped with a rectifier and an inverter that are independent of each other and can maintain operating states simultaneously in the UPS. The energy storage system of the charging station mainly supplies power to a power module of a charging device, and generally has three operating states including a charging state, a discharging state, and a standby state. In the charging state, the AC/DC bidirectional converter operates in a rectification state in which the AC/DC bidirectional converter can rectify an alternating current of the power grid and then output the rectified alternating current to an energy storage battery to charge the energy storage battery. In the discharging state, the AC/DC bidirectional converter operates in an inversion state in which the AC/DC bidirectional converter can convert a power from the energy storage battery into an alternating current to supply power to the charging device. The standby state refers to a non-operating state of the AC/DC bidirectional converter. When an uninterruptible power supply function is achieved by a minor modification or no modification on the energy storage system equipped in the existing charging station, the uninterruptible power supply function can be achieved without separately providing an uninterruptible power supply, which can significantly reduce the cost.

Based on the above concept, the inventor has performed further research. A power supply control system 100 is provided, which is applied in an electric vehicle charging station having an energy storage system 30. The power supply control system 100 is additionally provided with an uninterruptible power supply operating state without changing a topology relationship of the energy storage system 30 of the charging station. As illustrated in FIG. 2, the power supply control system 100 includes a transformer 10 connected to the power grid, an output socket 20, and the energy storage system 30. The output socket 20 is connected to the transformer 10 via an alternating current bus and is configured to be connected to an electric device in the electric vehicle charging station. The electric device herein includes a low voltage system in the charging station (e.g. some controllers) and a to-be-charged device. The energy storage system 30 includes an AC/DC bidirectional converter 31 and an energy storage battery 32 connected to the alternating current bus via the AC/DC bidirectional converter 31. The energy storage system 30 is configured to be controlled to, in response to the power supply control system being in an uninterruptible power supply mode, switch the AC/DC bidirectional converter 31 into an inversion state, and output no electric energy when the power grid has a normal voltage and supply electric energy only by the energy storage system 30 when the power grid has an abnormal voltage. The alternating current bus of the energy storage system 30 herein may be connected in parallel with a power supply of the controller of the charging station to enable the energy storage system 30 to supply power to the controller of the charging station, thereby ensuring that the controller of the charging station can control the energy storage system 30 to provide the alternating current for the charging station when the power grid has the abnormal power supply, which can avoid an abnormal operation of the charging station due to the power failure of the power grid.

In this embodiment, by controlling the existing energy storage system 30, without changing a system layout, the uninterruptible power supply function can be achieved through controlling an output of the energy storage system 30. That is, in response to the power supply control system 100 being in the uninterruptible power supply mode, the AC/DC bidirectional converter 31 is switched into the inversion state, and no electric energy is outputted when the power grid has the normal voltage and the electric energy is supplied only by the energy storage system when the power grid has the abnormal voltage. That is, this embodiment provides a solution in which no additional uninterruptible power supply is required for the charging station having the energy storage system 30. In such a solution, separate rectifier and inverter that are independent of each other and can maintain the operating state simultaneously are not required. As a result, it is possible to reduce the cost of achieving the uninterruptible power supply function.

In an embodiment, the energy storage system 30 is configured to, in response to the power supply control system being in the uninterruptible power supply mode, in addition to switching the AC/DC bidirectional converter 31 into the inversion state: set an output voltage Vb of the AC/DC bidirectional converter 31 as a greater one of Ugrid-Gap and Umin, i.e., $Vb=\text{Max}[Ugrid-Gap, Umin]$; and set an output current of the AC/DC bidirectional converter 31 based on an output capacity of the AC/DC bidirectional converter 31 and a current output capacity of the energy storage battery 32. In the present disclosure, Ugrid represents a real-time voltage of the power grid, Gap represents a fixed value greater than 0, and Umin represents a voltage greater than or equal to a minimum current operating voltage of the electric vehicle charging station and smaller than the normal voltage of the power grid.

Generally, the power grid has a normal voltage of 220V/380V. When fluctuating, the voltage of the power grid may be temporarily higher or lower than the above value. It is generally considered that the power grid is in a power failure state when the voltage of the power grid is lower than 220V/380V. Umin may be determined as a minimum operating voltage Urmin of the current electronic vehicle charging station, or slightly higher than Urmin. For example, three devices are charging normally, voltages required for the three devices are 200V, 12V, and 24V, respectively, and accordingly Umin may be determined as 12V or 13V.

Generally, the voltage required for the devices in the electronic vehicle charging station is smaller than 220V, and 200V is already a higher voltage. Therefore, Umin should be lower than the normal voltage of the power grid. Gap is set to control the output voltage of the energy storage system 30 to be smaller than or equal to the voltage of the power grid when the power grid is normal.

In this embodiment, the output voltage of the AC/DC bidirectional converter 31 is set as the greater one of the Ugrid-Gap and the Umin. As a result, the output voltage of the energy storage system 30 is always lower than the voltage of the alternating current bus when the power grid has the normal voltage. In this case, the energy storage system 30 outputs no energy. When the voltage of the power grid fluctuates suddenly or even is interrupted, or is lower than a lowest voltage required for operation of other device in the charging station, the energy storage system 30 can maintain the voltage of the alternating current bus of a whole field station at a lowest operating voltage, which can ensure normal operations of all devices.

Further, setting manners of the above voltage and current enable the energy storage system 30 to be in a ready state when the power grid is normal, and to be directly switched into an output mode and supply power to the devices in the charging station when the power grid is powered off.

In a further embodiment, a smaller one of a first current-limiting value and a second current-limiting value is determined as the output current of the AC/DC bidirectional converter 31. The first current-limiting value is calculated based on the output capability of the AC/DC bidirectional converter, and the second current-limiting value is calculated based on the current output capability of the energy storage battery 32.

The output capacity herein may be a maximum allowable output power of the AC/DC bidirectional converter 31 and the energy storage battery 32. The output capacity of the battery is variable due to different environments. For example, the energy storage battery 32 has an output capacity of 100 kW at 20° C., and may only have an output capacity of 10 kW at −20° C. This inherent physical property of the energy storage battery 32 may be obtained through analysis and testing. Once the maximum output capacity of the energy storage battery 32 is determined, the above second current-limiting value can be calculated through combining with a parameter of the AC/DC bidirectional converter 31. Moreover, the parameter of the AC/DC bidirectional converter 31 would limit the output capacity thereof, and the above first current-limiting value can be calculated based on this parameter. Of course, the first current-limiting value may also be a parameter directly provided by the AC/DC bidirectional converter 31, and can be obtained directly in this case. The smaller one of the first current-limiting value and the second current-limiting value is determined as the output current of the AC/DC bidirectional converter 31, which can avoid overloading of the AC/DC bidirectional converter 31.

In an embodiment, the energy storage system 30 is configured to, in response to the power supply control system 100 being in the uninterruptible power supply mode, in addition to switching the AC/DC bidirectional converter 31 into the inversion state: set an output current of the AC/DC bidirectional converter as 0 and an output voltage Vb as a rated voltage when the power grid has the normal voltage; and set the output current of the AC/DC bidirectional converter 31 as a required current Ireq of the electric device in the electric vehicle charging station and the output voltage Vb as the rated voltage when the power grid has the abnormal voltage. Generally, the rated voltage value is 220V/380V.

In some embodiments, when the AC/DC bidirectional converter 31 is in the inversion state, both a voltage loop and a current loop are set. When the power grid has the normal voltage, a voltage setting value of the voltage loop is set as 220V/380V, and a current setting value of the current loop is set as 0. When the power grid has the abnormal voltage, the voltage setting value of the voltage loop is still set as 220V/380V, and the current setting value of the current loop is increased up to Ireq.

In some embodiments of the present disclosure, the power supply control system 100 further has a power grid power supply mode and a standby mode. The power grid power supply mode herein means that the power is supplied by the power grid while the grid can charge the energy storage system 30. In this case, the AC/DC bidirectional converter 31 is switched into the rectification state. That is, the energy storage system 30 is configured to switch the AC/DC bidirectional converter 31 into the rectification state in response to the power supply control system 100 being in the power grid power supply mode. The standby mode refers to a state in which it is not necessary to charge the energy storage battery 32 or to supply power by the energy storage battery 32. That is, the energy storage system 30 is configured to switch the AC/DC bidirectional converter 31 into a non-operating state in response to the power supply control system 100 being in the standby mode.

The present disclosure further provides a power supply control method applied in the above power supply control system 100. The control method may include a control step S30 in the uninterruptible power supply mode of, in response to the power supply control system being in the uninterruptible power supply mode: switching the AC/DC bidirectional converter 31 into the inversion state; and controlling the energy storage system 30 to output no electric energy when the power grid has the normal voltage and to supply the electric energy only by the energy storage system 30 when the power grid has the abnormal voltage.

In this embodiment, by controlling the existing energy storage system 30, without changing a system layout, the uninterruptible power supply function can be achieved through controlling an output of the energy storage system 30. That is, in response to the power supply control system 100 being in the uninterruptible power supply mode, the AC/DC bidirectional converter 31 is switched into the inversion state, and no electric energy is outputted when the power grid has the normal voltage and the electric energy is supplied only by the energy storage system when the power grid has the abnormal voltage. That is, this embodiment provides a solution in which no additional uninterruptible power supply is required for the charging station having the energy storage system 30. In such a solution, no separate rectifier and inverter that are independent of each other and can maintain the operating state simultaneously are not required. As a result, it is possible to reduce the cost of achieving the uninterruptible power supply function.

Figure 3:
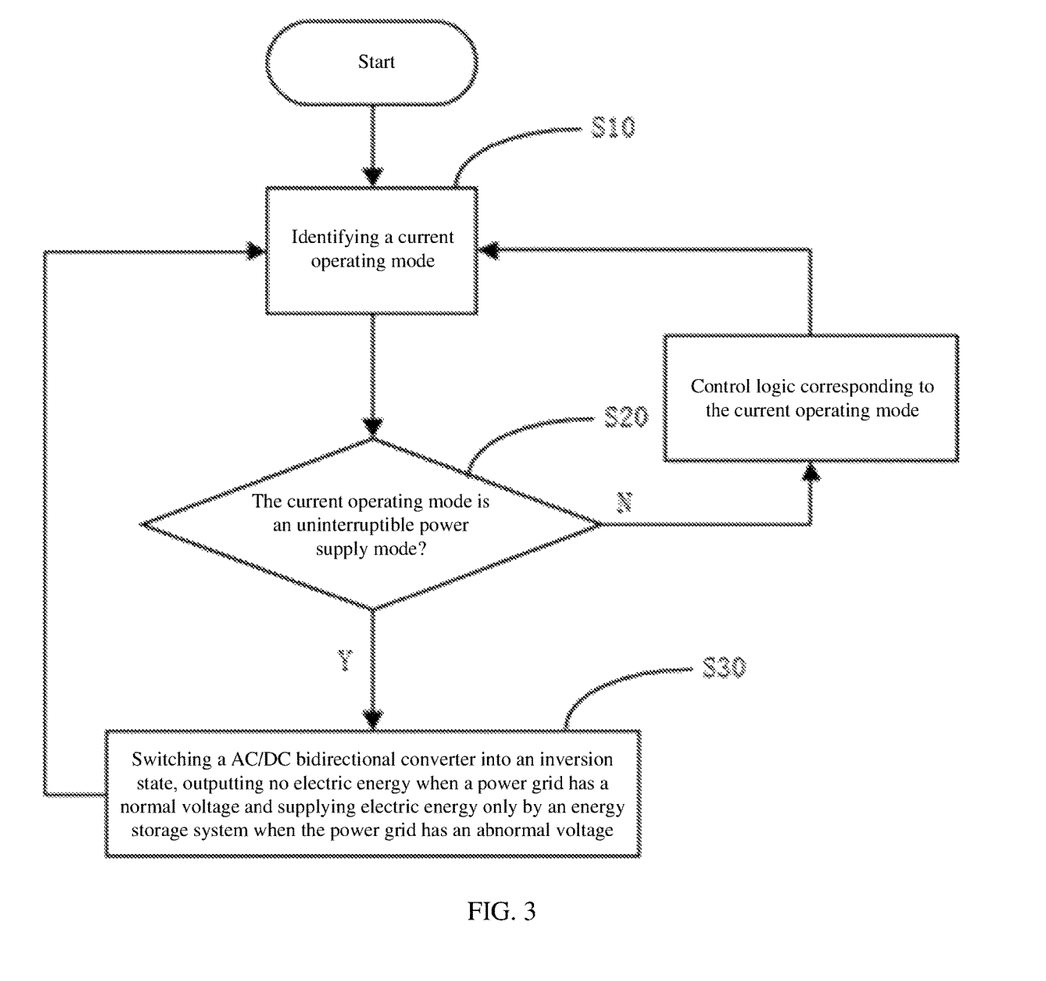
FIG. 3 is a flowchart of a power supply control method according to an embodiment of the present disclosure.

FIG. 3 is a flowchart of a power supply control method according to an embodiment of the present disclosure. As illustrated in FIG. 3, in the embodiment, the power supply control method includes an identification step S10, a determining step S20, and a control step S30 in the uninterruptible power supply mode.

In the identification step S10, a current operating mode of the power supply control system is identified. The operating mode may be manually selected and set.

In the determining step S20, it is determined whether the current operating mode is the uninterruptible power supply mode. If it is determined that the current operating mode is the uninterruptible power supply mode, the method proceeds to the control step S30 in the uninterruptible power supply mode. Otherwise, the method proceeds to a control logic corresponding to the current operating mode. For example, in response to identifying that the current operating mode is the power grid power supply mode, the AC/DC bidirectional converter is controlled to be switched into the rectification state. In this case, the energy storage battery 32 is charged by the power grid via the AC/DC bidirectional converter 31. In response to identifying that the current operating mode is the standby mode, the AC/DC bidirectional converter 31 is controlled to be switched into the non-operating state.

In the control step S30 in the uninterruptible power supply mode, in response to the power supply control system 100 being in the uninterruptible power supply mode, the AC/DC bidirectional converter 31 is switched into the inversion state, and the energy storage system 30 is controlled to output no electric energy when the power grid has the normal voltage and the electric energy is only supplied by the energy storage system 30 when the power grid has the abnormal voltage.

In a further embodiment, in the control step S30 in the uninterruptible power supply mode, the controlling the energy storage system to output no electric energy when the power grid has the normal voltage and to supply the electric energy only by the energy storage system when the power grid has the abnormal voltage includes, in response to the power supply control system being in the uninterruptible power supply mode: setting an output voltage Vb of the AC/DC bidirectional converter as a greater one of Ugrid-Gap and Umin; and setting an output current of the AC/DC bidirectional converter based on an output capability of the AC/DC bidirectional converter and a current output capability of the energy storage battery. Ugrid represents a real-time voltage of the power grid. Gap represents a fixed value greater than 0. Umin represents a voltage greater than or equal to a minimum operating voltage of the electric vehicle charging station and smaller than a normal voltage of the power grid.

In the above embodiment, the output voltage and output current of the AC/DC bidirectional converter 31 are set. As a result, it is possible to ensure that the output voltage of the energy storage system 30 is always lower than the voltage of the alternating current bus when the power grid has the normal voltage. In this case, the energy storage system 30 outputs no energy. When the voltage of the power grid fluctuates suddenly or even is interrupted, or is lower than a lowest voltage required for operation of other device in the charging station, the energy storage system 30 can maintain the voltage of the alternating current bus of a whole field station at a lowest operating voltage, which can ensure normal operations of all devices.

Further, setting manners of the above voltage and current enable the energy storage system 30 to be in a ready state when the power grid is normal, and to be directly switched into an output mode and supply power to the devices in the charging station when the power grid is powered off.

In a further embodiment, the setting the output current of the AC/DC bidirectional converter 31 based on the output capability of the AC/DC bidirectional converter 31 and the current output capability of the energy storage battery 32 includes: calculating a first current-limiting value based on the output capability of the AC/DC bidirectional converter 31; calculating a second current-limiting value based on the current output capability of the energy storage battery 32; and determining a smaller one of the first current-limiting value and the second current-limiting value as the output current of the AC/DC bidirectional converter 31.

The output capacity herein may be a maximum allowable output power of the AC/DC bidirectional converter 31 and the energy storage battery 32. The output capacity of the battery is variable due to different environments. For example, the energy storage battery 32 has an output capacity of 100 kW at 20° C., and may only have an output capacity of 10 kW at −20° C. This inherent physical property of the energy storage battery 32 may be obtained through analysis and testing. Once the maximum output capacity of the energy storage battery 32 is determined, the above second current-limiting value can be calculated through combining with a parameter of the AC/DC bidirectional converter 31. Moreover, the parameter of the AC/DC bidirectional converter 31 would limit the output capacity thereof, and the above first current-limiting value can be calculated based on this parameter. Of course, the first current-limiting value may also be a parameter directly provided by the AC/DC bidirectional converter 31, and can be obtained directly in this case. The smaller one of the first current-limiting value and the second current-limiting value is determined as the output current of the AC/DC bidirectional converter 31, which can avoid overloading of the AC/DC bidirectional converter 31.

In another embodiment, in the control step S30 in the uninterruptible power supply mode, the controlling the energy storage system to output no electric energy when the power grid has the normal voltage and to supply the electric energy only by the energy storage system when the power grid has the abnormal voltage includes, in response to the power supply control system being in the uninterruptible power supply mode: setting an output current of the AC/DC bidirectional converter 31 set as 0 and an output voltage Vb as a rated voltage value when the power grid has the normal voltage, and setting the output current of the AC/DC bidirectional converter 31 as a required current of the electric device in the electric vehicle charging station and the output voltage Vb as the rated voltage when the power grid has the abnormal voltage.

In some embodiments, when the AC/DC bidirectional converter 31 is in the inversion state, both a voltage loop and a current loop are set. When the power grid has the normal voltage, a voltage setting value of the voltage loop is set as 220V/380V, and a current setting value of the current loop is set as 0. When the power grid has the abnormal voltage, the voltage setting value of the voltage loop is still set as 220V/380V, and the current setting value of the current loop is increased up to Ireq.

Those skilled in the art should appreciated that although the exemplary embodiments of the present disclosure have been illustrated and described in detail herein, many other variants or modifications consistent with the principle of the present disclosure may still be directly determined or derived based on the content of the present disclosure without departing from the spirit and scope of the present disclosure. Therefore, all these other variants or modifications should be understood and considered to fall within the scope of the present disclosure.

What is claimed is:

1. A power supply control system, applied in an electric vehicle charging station having an energy storage system, the power supply control system comprising:
    a transformer connected to a power grid;

an output socket connected to the transformer via an alternating current bus and configured to be connected to an electric device in the electric vehicle charging station; and an energy storage system comprising an alternating-current/direct-current, AC/DC, bidirectional converter and an energy storage battery connected to the alternating current bus via the AC/DC bidirectional converter, wherein the energy storage system is configured to be controlled to, in response to the power supply control system being in an uninterruptible power supply mode:
switch the AC/DC bidirectional converter into an inversion state; and
output no electric energy when the power grid has a normal voltage and supply electric energy only by the energy storage system when the power grid has an abnormal voltage.

2. The power supply control system according to claim 1, wherein the energy storage system is further configured to, in response to the power supply control system being in the uninterruptible power supply mode, in addition to switching the AC/DC bidirectional converter into the inversion state:
set an output voltage Vb of the AC/DC bidirectional converter as a greater one of Ugrid-Gap and Umin; and
set an output current of the AC/DC bidirectional converter based on an output capability of the AC/DC bidirectional converter and a current output capability of the energy storage battery, where:
Ugrid represents a real-time voltage of the power grid;
Gap represents a fixed value greater than 0; and
Umin represents a voltage greater than or equal to a minimum operating voltage of the electric vehicle charging station and smaller than the normal voltage of the power grid.

3. The power supply control system according to claim 2, wherein a smaller one of a first current-limiting value and a second current-limiting value is determined as the output current of the AC/DC bidirectional converter, the first current-limiting value being calculated based on the output capability of the AC/DC bidirectional converter, and the second current-limiting value being calculated based on the current output capability of the energy storage battery.

4. The power supply control system according to claim 3, wherein the energy storage system is further configured to switch the AC/DC bidirectional converter into a rectification state in response to the power supply control system being in a power grid power supply mode.

5. The power supply control system according to claim 3, wherein the energy storage system is further configured to switch the AC/DC bidirectional converter into a non-operating state in response to the power supply control system being in a standby mode.

6. The power supply control system according to claim 2, wherein the energy storage system is further configured to switch the AC/DC bidirectional converter into a rectification state in response to the power supply control system being in a power grid power supply mode.

7. The power supply control system according to claim 2, wherein the energy storage system is further configured to switch the AC/DC bidirectional converter into a non-operating state in response to the power supply control system being in a standby mode.

8. The power supply control system according to claim 1, wherein the energy storage system is further configured to, in response to the power supply control system being in the uninterruptible power supply mode, in addition to switching the AC/DC bidirectional converter into the inversion state:
set an output current of the AC/DC bidirectional converter as 0 and an output voltage Vb as a rated voltage, when the power grid has the normal voltage; and
set the output current of the AC/DC bidirectional converter as a required current of the electric device in the electric vehicle charging station and the output voltage Vb as the rated voltage, when the power grid has the abnormal voltage.

9. The power supply control system according to claim 8, wherein the energy storage system is further configured to switch the AC/DC bidirectional converter into a rectification state in response to the power supply control system being in a power grid power supply mode.

10. The power supply control system according to claim 8, wherein the energy storage system is further configured to switch the AC/DC bidirectional converter into a non-operating state in response to the power supply control system being in a standby mode.

11. The power supply control system according to claim 1, wherein the energy storage system is further configured to switch the AC/DC bidirectional converter into a rectification state in response to the power supply control system being in a power grid power supply mode.

12. The power supply control system according to claim 1, wherein the energy storage system is further configured to switch the AC/DC bidirectional converter into a non-operating state in response to the power supply control system being in a standby mode.

13. A power supply control method, applied in a power supply control system applied in an electric vehicle charging station having an energy storage system, the power supply control system comprising:
a transformer connected to a power grid;
an output socket connected to the transformer via an alternating current bus and configured to be connected to an electric device in the electric vehicle charging station; and
an energy storage system comprising an alternating-current/direct-current, AC/DC, bidirectional converter and an energy storage battery connected to the alternating current bus via the AC/DC bidirectional converter,
wherein the energy storage system is configured to be controlled to, in response to the power supply control system being in an uninterruptible power supply mode:
switch the AC/DC bidirectional converter into an inversion state; and
output no electric energy when the power grid has a normal voltage and supply electric energy only by the energy storage system when the power grid has an abnormal voltage,
the power supply control method comprising a control step in the uninterruptible power supply mode of, in response to the power supply control system being in the uninterruptible power supply mode:
switching the AC/DC bidirectional converter into the inversion state; and
controlling the energy storage system to output no electric energy when the power grid has the normal voltage and to supply the electric energy only by the energy storage system when the power grid has the abnormal voltage.

14. The power supply control method according to claim 13, wherein said controlling the energy storage system to output no electric energy when the power grid has the normal voltage and to supply the electric energy only by the energy storage system when the power grid has the abnormal voltage comprises:

setting, in response to the power supply control system being in the uninterruptible power supply mode, an output voltage Vb of the AC/DC bidirectional converter as a greater one of Ugrid-Gap and Umin; and setting an output current of the AC/DC bidirectional converter based on an output capability of the AC/DC bidirectional converter and a current output capability of the energy storage battery, where:

Ugrid represents a real-time voltage of the power grid;

Gap represents a fixed value greater than 0; and

Umin represents a voltage greater than or equal to a minimum current operating voltage of the electric vehicle charging station and smaller than a normal voltage of the power grid.

15. The power supply control method according to claim 14, wherein said setting the output current of the AC/DC bidirectional converter based on the output capability of the AC/DC bidirectional converter and the current output capability of the energy storage battery comprises:

calculating a first current-limiting value based on the output capability of the AC/DC bidirectional converter;

calculating a second current-limiting value based on the current output capability of the energy storage battery; and determining a smaller one of the first current-limiting value and the second current-limiting value as the output current of the AC/DC bidirectional converter.

16. The power supply control method according to claim 13, wherein said controlling the energy storage system to output no electric energy when the power grid has the normal voltage and to supply the electric energy only by the energy storage system when the power grid has the abnormal voltage comprises:

setting an output current of the AC/DC bidirectional converter as 0 and an output voltage Vb as a rated voltage value, when the power grid has the normal voltage; and setting the output current of the AC/DC bidirectional converter as a required current of the electric device in the electric vehicle charging station and the output voltage Vb as the rated voltage, when the power grid has the abnormal voltage.

17. The power supply control method according to claim 13, further comprising, prior to the control step in the uninterruptible power supply mode:

an identification step of identifying a current operating mode of the power supply control system; and performing the control step in the uninterruptible power supply mode in response to identifying that the current operating mode of the power supply control system is the uninterruptible power supply mode.

18. The power supply control method according to claim 14, further comprising, prior to the control step in the uninterruptible power supply mode:

an identification step of identifying a current operating mode of the power supply control system; and performing the control step in the uninterruptible power supply mode in response to identifying that the current operating mode of the power supply control system is the uninterruptible power supply mode.

19. The power supply control method according to claim 17, further comprising, subsequent to the identification step:

controlling, in response to identifying that the current operating mode of the power supply control system is a power grid power supply mode, the AC/DC bidirectional converter to be switched into a rectification state to supply power through the power grid.

20. The power supply control method according to claim 17, further comprising, subsequent to the identification step:

controlling, in response to identifying that the current operating mode of the power supply control system is a standby mode, the AC/DC bidirectional converter to be switched into a non-operating state.

* * * * *